US011810255B2

(12) United States Patent
Aigerman et al.

(10) Patent No.: US 11,810,255 B2
(45) Date of Patent: Nov. 7, 2023

(54) SWEPT VOLUME DETERMINATION TECHNIQUES

(71) Applicant: Adobe Inc., San Jose, CA (US)

(72) Inventors: Noam Aigerman, San Francisco, CA (US); Silvia Gonzalez Sellan, Toronto (CA); Alec Jacobson, Toronto (CA)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/333,147

(22) Filed: May 28, 2021

(65) Prior Publication Data

US 2022/0383593 A1 Dec. 1, 2022

(51) Int. Cl.
*G06T 17/20* (2006.01)
*G06T 7/20* (2017.01)
*G06T 15/08* (2011.01)
*G06T 19/20* (2011.01)

(52) U.S. Cl.
CPC .............. *G06T 17/205* (2013.01); *G06T 7/20* (2013.01); *G06T 15/08* (2013.01); *G06T 19/20* (2013.01); *G06T 2207/30241* (2013.01); *G06T 2219/2021* (2013.01)

(58) Field of Classification Search
CPC ......... G06T 17/205; G06T 7/20; G06T 15/08; G06T 19/20; G06T 2207/30241; G06T 2219/2021
See application file for complete search history.

(56) References Cited

U.S. PATENT DOCUMENTS

| 5,542,036 | A  | * | 7/1996 | Schroeder | G06T 17/10 345/424 |
| 5,898,793 | A  | * | 4/1999 | Karron | G06T 17/20 382/154 |
| 6,993,461 | B1 | * | 1/2006 | Boussac | G06T 17/10 703/2 |
| 10,593,112 | B1 | * | 3/2020 | Zar | G06T 17/20 |
| 2005/0219245 | A1 | * | 10/2005 | Tao | G06T 17/20 345/424 |

(Continued)

OTHER PUBLICATIONS

Mihai Aldén, Fast and Adaptive Polygon Conversion By Means Of Sparse Volumes, Sep. 2, 2011, Department of Science and Technology, Linköping University, SE-601 74 Norrköping, Sweden, pp. 1-74 (Year: 2011).*

(Continued)

*Primary Examiner* — Phuc N Doan
(74) *Attorney, Agent, or Firm* — Kilpatrick Townsend & Stockton LLP

(57) ABSTRACT

Techniques for determining a swept volume of an object moving along a trajectory in a 3D space are disclosed. In some examples, a computer graphics application accesses a representation of the object, such as the signed distance field (SDF), and the trajectory information describing the movement path in the 3D space over a time period. The 3D space is represented using a grid of voxels each having multiple vertices. The computer graphics application determines the swept volume of the object in the 3D space by evaluating a subset of the grid of voxels (e.g., the voxels surrounding the surface of the swept volume). The number of voxels in the subset of voxels is less than the number of voxels in the grid of voxels. The computer graphics application further generates a representation of the swept volume surface for output.

20 Claims, 11 Drawing Sheets

(56) References Cited

U.S. PATENT DOCUMENTS

| | | | | |
|---|---|---|---|---|
| 2009/0244065 | A1* | 10/2009 | Storti | G06V 10/267 |
| | | | | 382/131 |
| 2010/0298967 | A1* | 11/2010 | Frisken | G06F 30/17 |
| | | | | 700/173 |
| 2014/0176545 | A1* | 6/2014 | Laine | G06T 11/40 |
| | | | | 345/424 |
| 2017/0278298 | A1* | 9/2017 | Hurter | G06T 7/187 |
| 2018/0035781 | A1* | 2/2018 | Byun | B65D 83/386 |

OTHER PUBLICATIONS

Dziegielewski et al, High Precision Conservative Surface Mesh Generation for Swept Volumes, Journal of Latex Class Files, vol. 6, No. 1, Jan. 2007 (Year: 2007).*

Abdel-Malek et al., Swept Volumes Fundation, Perspectives and Applications, International Journal of Shape Modeling, vol. 12, No. 1, Jun. 2006, pp. 87-127.

Abrams, Computing Swept Volumes, The Journal of Visualization and Computer Animation, vol. 11, 2000, pp. 69-82.

Allgower et al., Introduction to Numerical Continuation Methods, Available online at: https://epubs.siam.org/page/terms, 2003, 21 pages.

Barill et al., Fast Winding Nos. for Soups and Clouds, ACM Transactions on Graphics, vol. 37, No. 4, Aug. 2018, 12 pages.

Blackmore, Trimming Swept Volumes, Computer-Aided Design, vol. 31, No. 3, 1999, 215-223.

Bloomenthal, Polygonization of Implicit Surfaces, Computer-Aided Geometric Design, 1988, 20 pages.

Boyd et al., Convex Optimization, Cambridge University Press, 2004, 730 pages.

Campen et al., Polygonal Boundary Evaluation of Minkowski Sums and Swept Volumes, In Computer Graphics Forum, vol. 29, No. 5, 2010, pp. 1611-1622.

Cherchi et al., Fast and Robust Mesh Arrangements Using Floating-Point Arithmetic, ACM Transactions on Graphics, vol. 39, No. 6, 2020, 17 pages.

Davies et al., On the Effectiveness of Weight-Encoded Neural Implicit 3D Shapes, Available online at: https://arxiv.org/pdf/2009.09808.pdf, 2021, 13 pages.

Garg et al., Computational Design of Reconfigurables, ACM Transactions on Graphics, vol. 35 No. 4, 2016, 1 page.

Jacobson et al., A Simple C++ Geometry Processing Library, Available online at: http://libigl.github.io/libigl/, 2018, 8 pages.

Jacobson et al., Robust Inside-Outside Segmentation using Generalized Winding Nos. ACM Transactions on Graphics, vol. 32, No. 4, 2013, 12 pages.

Ju et al., Dual contouring of Hermite data, ACM Transactions on Graphics, vol. 21, 2002, pp. 339-346.

Kim et al., Fast swept Volume Approximation of Complex Polyhedral Models, Computer-Aided Design, vol. 36, No. 11, 2004, pp. 1013-1027.

Kobbelt et al., Feature Sensitive Surface Extraction from Volume Data, In Proceedings of the 28th Annual Conference on Computer Graphics and Interactive Techniques, 2001, pp. 57-66.

Lorensen et al., Marching Cubes: A high Resolution 3D Surface Construction Algorithm, ACM Siggraph Computer Graphics, vol. 21, No. 4, Jul. 1987, pp. 163-169.

Menon et al., More Powerful Solid Modeling Through Ray Representations, IEEE Computer Graphics and Applications, vol. 14, No. 3, 1994, pp. 1-2.

Nocedal et al., Numerical Optimization, Springer Series in Operations Research, 2006, 651 pages.

Park et al., DeepSDF: Learning Continuous Signed Distance Functions for Shape Representation, Cornell University, Computer Science; Computer Vision and Pattern Recognition, Accessed from internet on Mar. 18, 2020, 29 pages.

Pavic et al., High-Resolution Volumetric Computation of Offset Surfaces with Feature Preservation, Computer Graphics Forum, vol. 27, No. 2, 2008, 10 pages.

Peternell et al., Swept Volumes, Computer-Aided Design and Applications, vol. 2, No. 5, 2005, pp. 599-608.

Rossignac et al., Boundary of the Volume Swept by a Free-form Solid in Screw Motion, Computer-Aided Design, vol. 39, No. 9, 2007, pp. 745-755.

Schmidt et al., Generalized Sweep Templates for Implicit Modeling, In Proc. Graphite, 2005, pp. 187-196.

Schroeder et al., Implicit Modeling of Swept Surfaces and Volumes, In Proceedings Visualization'94. IEEE, 1994, pp. 40-45.

Sourin et al., Function Representation for Sweeping by a Moving Solid, In Proc. Symp. on Solid Modeling and Applications., May 1995, 10 pages.

Sungurtekin et al., Graphical Simulation & Automatic Verification of NC Machining Programs, IEEE International Conference on Robotics and Automation, vol. 3, 1986, pp. 1-2.

Von Dziegielewski et al., High Quality Conservative Surface Mesh Generation for Swept Volumes, IEEE International Conference on Robotics and Automation, 2012, pp. 764-769.

Wang et al., Geometric Modeling for Swept Volume of Moving Solids, IEEE Computer Graphics and Applications, vol. 6, No. 12, 1986, pp. 1-2.

Weld et al., Geometric Representation of Swept Volumes with Application to Polyhedral Objects, The International Journal of Robotics Research, vol. 9, No. 5, Oct. 1990, pp. 105-116.

Wyvill et al., Soft objects, In Advanced Computer Graphics. Springer, 1986, pp. 113-114.

Zhang et al., Reliable sweeps, SIAM/ACM Joint Conference on Geometric and Physical Modeling, 2009, pp. 373-378.

Zhou et al., Mesh Arrangements for Solid Geometry, ACM Transactions on Graphics, 2016, 15 pages.

* cited by examiner

SWEPT VOLUME DETERMINATION TECHNIQUES

TECHNICAL FIELD

This disclosure relates generally to techniques for computer graphics. Specifically, the present disclosure describes techniques for determining the swept volume of an object moving in the three-dimensional (3D) space along a trajectory.

BACKGROUND

The swept volume of a solid object in space (e.g., three dimensional (3D) space) is the union of all points in the space covered by positions of the object during a motion of the object in the space. For example, for motion of the object in 3D space along a trajectory over a period of time starting at a start time and ending at an end time, the swept volume of the object is the union of all points in the 3D space covered by positions of the object during motion of the object along the trajectory from the start time to the end time. Determining the swept volume can be useful in various different applications such as path planning, collision detection, and others. Existing swept volume determination techniques have various limitations. Some are limited to determining swept volumes only for specific types of object shapes or for specific trajectories. Others are very computationally intensive and expensive as they require the examination of the entire 3D space to determine the swept volume. These techniques also take a long time to compute the swept volume and also lead to artifacts in the generated swept volume.

SUMMARY

The present disclosure describes techniques for determining the swept volume of a moving object in the 3D space. In contrast to conventional techniques discussed above, the swept volume determination techniques described herein can be used for a wide variety of objects and trajectories, and thus provide a generalized and universally applicable solution for determining swept volumes. Further, the swept volume of an object is determined by only evaluating a subset of a grid of voxels representing the 3D space, leading to a significantly lower computational complexity and faster times for computation of the swept volume. Various embodiments are described herein, including methods, systems, non-transitory computer-readable storage media storing programs, code, or instructions executable by one or more processors, and the like.

In certain embodiments, given an object in the 3D space and the movement of the object in the 3D space along a trajectory from a first location in the 3D space to a second location in the 3D space over a time period, a subset of voxels are determined from a grid of voxels representing a three-dimension (3D) space. The subset of voxels include voxels for generating a surface of a swept volume for the object in the 3D space due to its movement along the trajectory. The number of voxels in the subset of voxels is less than the number of voxels in the grid of voxels. The determining is performed by processing a second subset of voxels from the grid of voxels. The number of voxels in the second subset of voxels is also less than the number of voxels in the grid of voxels. A representation of the surface of the swept volume for the object is further generated using the subset of voxels These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
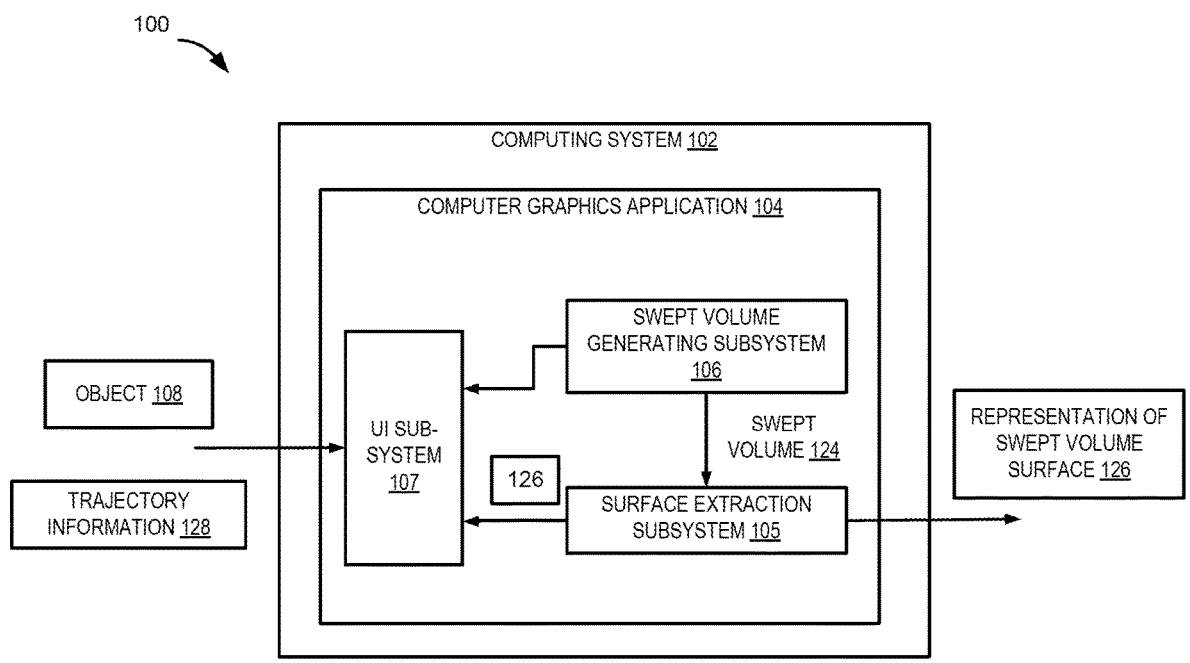
FIG. 1 depicts an example of a computing environment for determining the swept volume of a moving object in a 3D space, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure describes techniques for determining the swept volume of a moving object in a 3D space. In contrast to conventional techniques discussed above, the swept volume determination techniques described herein can be used for a wide variety of objects and trajectories, and thus provide a generalized and universally applicable solution for determining swept volumes. Further, the swept volume of an object is determined by only evaluating a subset of a grid of voxels representing the 3D space, leading to a significantly lower computational complexity and faster times for computation of the swept volume.

As discussed above, existing techniques for generating swept volumes have certain limitations. For example, existing techniques are limited to generating swept volumes only for certain types of shapes and trajectories. Additionally, existing technique have to process the entire 3D space and are thus computationally intensive and expensive and the computation takes a long time. In contrast to the existing techniques discussed above, the swept volume determination techniques disclosed herein provide a more generalized solution for computing swept volumes for a wide variety of objects (e.g., object of different shapes) and for a wide variety of trajectories. The improved swept volume computation techniques described herein can determine the swept volume without having to process the entire 3D space, for example, without having to process every voxel in the grid of voxels representing the 3D space. As a result, the techniques described herein are more efficient and compute swept volumes with lower computational complexity and in faster time. The techniques described herein can be used generally as long as the representation of the object's movement in the 3D space and the trajectory of the movement are differentiable with respect to time. This enables the swept volume to be determined in real-world applications where the swept volumes have to be computed efficiently and quickly.

In certain embodiments, the techniques described herein output a surface of the volume swept volume, where the surface represents the swept volume. The swept volume is determined using voxels in the 3D space that lie near the surface of the volume swept by the object as it moves along a trajectory or path in the 3D space over time. The input of this swept volume determination process is a representation, such as the signed distance field (SDF), of an object moving in the 3D space over a period of time and the trajectory of the movement. The 3D space is represented using a grid of voxels each having multiple vertices. One or more seed locations that are known to be on the surface of the swept volume are also obtained. Based on these seed locations, a local growth algorithm is used to grow the voxels that are processed to compute the swept volume. In this way, only those voxels through which the surface of the swept volume passes and those voxels that lie close to those voxels are processed. This enables the computation to be performed without processing all the voxels in the 3D space. During this local growth process, the time is treated as a continuous variable (rather than being sampled). The output of this process is the set of voxels that are processed during this process. A representation of the swept volume surface, such as a polygon mesh for the surface of the swept volume, can be generated based on the output. In certain embodiments, the swept volume determination functionality described above is provided by a computer graphics application.

The following non-limiting example is provided to introduce certain embodiments. In this example, a computer graphics application receives a request to generate a swept volume of an object moving along a trajectory in a 3D space. The computer graphics application receives or otherwise accesses a representation of the object and trajectory information of the object moving in the 3D space over a time period. The swept volume generating subsystem further converts or has another component to convert the representation of the object into the SDF representation if the object is represented in another format such as a polygon mesh. In some examples, the SDF representation of the object is defined over the grid of voxels by assigning an SDF value to each vertex in the grid of voxels. The trajectory information describes the path of the movement of the object in the 3D space and the associated time information.

According to the embodiments presented herein, the computer graphics application determines the swept volume of the object by determining the surface of the swept volume. The computer graphics application starts with one or more seed locations. A seed location is a point in the 3D space whose location is known to be on the surface of the swept volume at some point in time as the object moves over time in the 3D space along the trajectory. The seed locations can be input to the computer graphics application or calculated by the computer graphics application based on the SDF of the object and the trajectory information. The computer graphics application further identifies initial voxels that contain the seed locations.

For each of these initial voxels, the computer graphics application performs the following operations for its vertices one by one. For a given vertex, the computer graphics application determines the minimum SDF value of the vertex during the movement of the object and the corresponding time when that minimum SDF value is achieved. This minimum SDF value provides as indication of whether this given vertex is inside the swept volume (in certain embodiments, this is indicated when the minimum SDF value is negative), outside the swept volume (in certain embodiments, this is indicated when the minimum SDF value is positive), or on the surface of the swept volume (in certain embodiments, this is indicated when the minimum SDF value is zero). Since the initial voxels contain the seed locations that are on the surface of swept volume, the computer graphics application can expand the voxels to be evaluated along the surface of the swept volume by evaluating neighboring voxels of these initial voxels. These neighboring voxels can be identified by two ways. In one way, the neighboring voxels can include the voxels that share a same vertex with the current voxel. In the other way, the neighboring voxels can include the voxels that share a same edge with the current voxel. Each of the neighboring voxels is evaluated in a similar way as the initial voxels and further neighboring voxels are identified and evaluated. In this way, the voxels that are near the surface of the swept volume can be identified. The computer graphics application further extracts the surface of swept volume from these identified voxels for rendering the swept volume or other applications.

The swept volume determination techniques described herein provide several improvements and benefits over conventional techniques. In contrast to conventional techniques discussed above, the swept volume determination techniques described herein can be used for a wide variety of objects and trajectories, and thus provide a generalized and universally applicable solution for determining swept volumes. Further, the swept volume of an object is determined by only evaluating a subset of a grid of voxels representing the 3D space, for example, only the voxels near the surface of the swept volume. As a result, voxels deep inside the swept volume or far away outside the swept volume are not evaluated nor stored, thereby saving the computational and storage resources. Since the techniques presented herein do not rely on nor make any assumption on the shape or trajectory of the object, the swept volume techniques can be applied robustly and efficiently onto various types of objects in various real-world applications.

Referring now to the drawings, FIG. 1 depicts an example of a computing environment 100 for determining the swept volume of an object 108 moving along a trajectory in a 3D space. The computing environment 100 includes a computing system 102, which can include computer graphics application 104. To determine the swept volume of the object 108, the computer graphics application 104 includes a swept volume generating subsystem 106 configured for determining the swept volume 124 of the object 108 based on trajectory information 128 of the trajectory of the object 108. The computer graphics application 104 also includes a surface extraction subsystem 105 configured for extracting the surface of the determined swept volume and outputting a representation of the swept volume surface 126. The computer graphics application 104 further includes a user interface (UI) subsystem 107 configured to receive input to the computer graphics application 104, such as the input object 108 and the trajectory information 128.

The computer graphics application 104, the swept volume generating subsystem 106, the surface extraction subsystem 105, and the UI subsystem 107 may be implemented using software (e.g., code, instructions, program) executed by one or more processing units (e.g., processors, cores), hardware, or combinations thereof. The software may be stored on a non-transitory storage medium (e.g., on a memory device). The computing environment 100 depicted in FIG. 1 is merely an example and is not intended to unduly limit the scope of claimed embodiments. One of ordinary skill in the art would recognize many possible variations, alternatives, and modifications. For example, in some implementations, the computing system 102 can be implemented using more or fewer systems or subsystems than those shown in FIG. 1, may combine two or more subsystems, or may have a different configuration or arrangement of the systems or subsystems.

The computer graphics application 104 can be configured to receive, via the UI subsystem 107, a request to generate a swept volume for an object 108, the object 108 and trajectory information 128 of the object 108. For example, the UI subsystem 107 can present a user interface allowing a user to select or otherwise input the object 108 and specify the trajectory information 128. An example of the object 108 is shown in FIG. 7A as a dumbbell 702. The object 108 can be represented in any format, such as a polygon mesh, an SDF, and so on. In some examples, the object 108 can be any solid shape representation that admits a continuous implicit function, such as analytic signed distance functions, approximate signed distance functions (e.g., arising from constructive solid geometry operations or ShaderToy-esque metric manipulations), and robust winding-number signed distances from triangle meshes and point clouds.

The trajectory information 128 of the object 108 describes the trajectory or path of the movement of the object 108 and the associated time information. In the example shown in FIG. 7A, the trajectory 704 describes the path of the movement of the dumbbell 702 in the 3D space. In some examples, the trajectory could be any representation of a rigid motion (including, but not limited to, translations, screws, and splines), but also encompasses articulated rigid bodies (e.g., a union of each body's sweep), and Minkowski sums (generalizing 1D trajectory curve to a high-dimensional parametric space).

The computer graphics application 104 uses the swept volume generating subsystem 106 to determine the swept volume 124 of the object 108 in the 3D space. In some examples, the 3D space is represented using a regular grid and each element on the grid is referred to as a voxel. Each voxel has eight vertices and twelve edges. When the object 108 moves in the 3D space following the trajectory, some voxels will be passed through, completely or partially, by the object 108 while others will not be touched by the object 108. According to the swept volume determination techniques presented herein, the swept volume generating subsystem 106 only evaluates a subset of the voxels (and their associated vertices and edges) in the voxel grid to determine the swept volume 124.

In some examples, the subset of the voxels being evaluated includes the voxels containing the enclosing surface of the swept volume 124 and their neighboring voxels. The swept volume generating subsystem 106 can identify this subset of voxels by starting at a voxel containing a seed location that is known to be on the surface of the swept volume 124. The seed location can be determined by the swept volume generating subsystem 106 or received via the UI subsystem 107. The swept volume generating subsystem 106 can evaluate the vertices of this voxel one by one to determine whether these vertices belong to the swept volume 124 or not. The swept volume generating subsystem 106 then identifies edges that cross the surface of the swept volume 124, referred to as surface-crossing edges. An edge crosses the surface of the swept volume 124 if one vertex of the edge is inside the swept volume 124 and the other vertex is outside the swept volume 124. Neighboring voxels that share at least one surface-crossing edge with the current voxel are identified. The swept volume generating subsystem 106 then evaluates these neighboring voxels in a similar way as described above to identify more neighboring voxels.

The above process can continue until no more neighboring voxels can be identified, at which point the surface of the swept volume 124 and thus the swept volume 124 can be identified. Because the above process focuses on voxels that contain the surface of the swept volume 124 and their neighboring voxels, the evaluation process does not need to evaluate voxels that are far deep inside and outside the swept volume 124, thereby significantly reducing the computations involved in identifying the swept volume 124. The computer graphics application 104 then uses the surface extraction subsystem 105 to generate a representation of the swept volume surface 126, such as a polygon mesh of the surface of the swept volume 124. The swept volume surface 126 can then be sent to the UI subsystem 107 where the swept volume surface 126 is rendered and displayed in a user interface. Alternatively, or additionally, the swept volume surface 126 can be output to other systems or other components of the computing system 102 for further processing. Additional details about generating the swept volume 124 and the representation of the swept volume surface 126 are provided below with respect to FIGS. 2-7.

Figure 2:
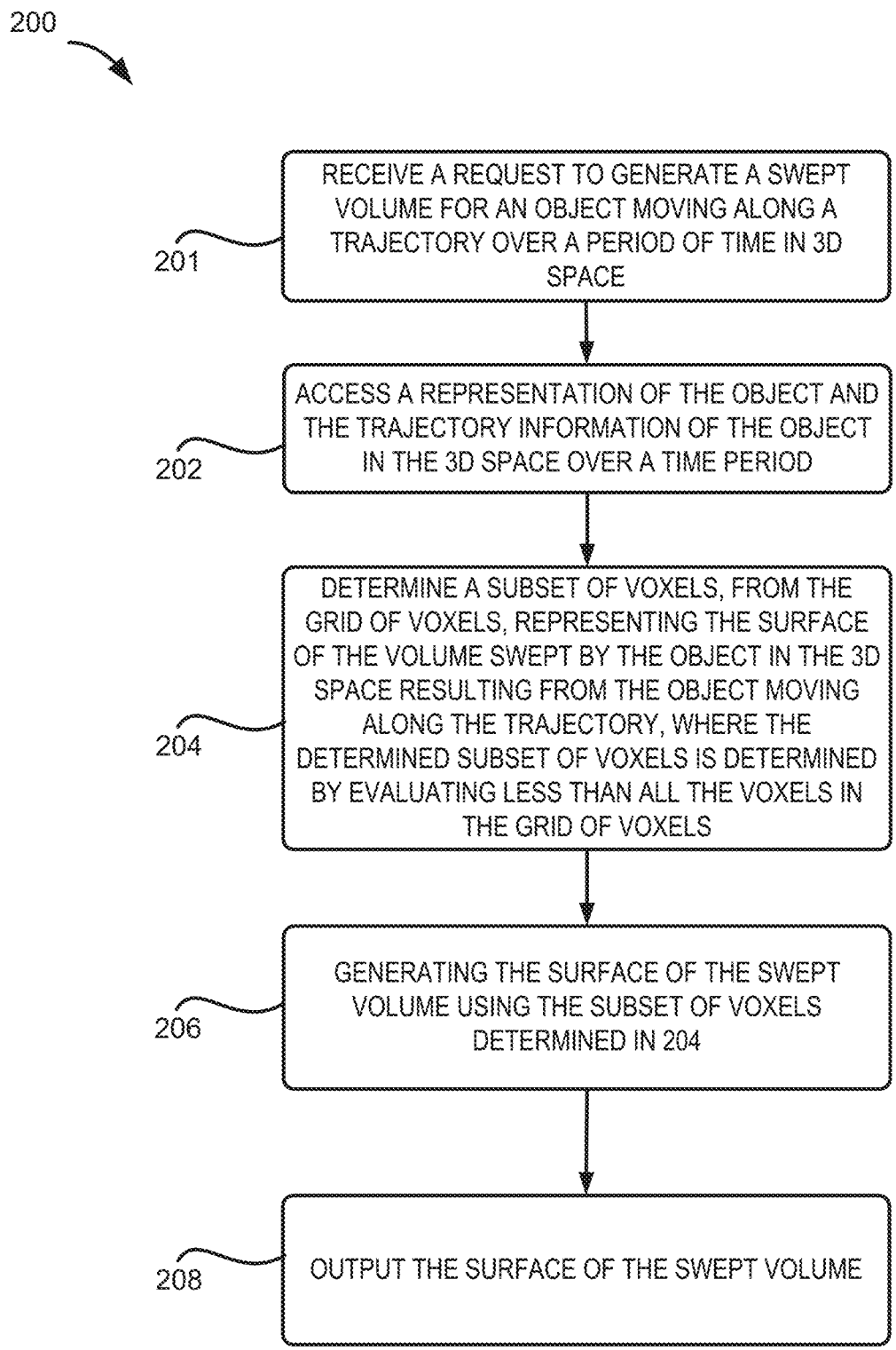
FIG. 2 depicts an example of a process for determining the swept volume of a moving object in a 3D space, according to certain embodiments disclosed herein.

FIG. 2 depicts an example of a process 200 for determining the swept volume of a moving object in a 3D space, according to certain embodiments of the present disclosure. One or more computing devices (e.g., the computing system 102) implement operations depicted in FIG. 2 by executing suitable program code (e.g., the computer graphics application 104). The software or program code may be stored on a non-transitory storage medium (e.g., on a memory device). The process depicted in FIG. 2 and described below is intended to be illustrative and non-limiting. Although FIG. 2 depicts the various processing blocks occurring in a particular sequence or order, this is not intended to be limiting. In certain alternative embodiments, the blocks may be performed in some different order or some blocks may also be performed in parallel. In certain embodiments, such as in the embodiment depicted in FIG. 1, the process depicted in FIG. 2 may be performed by the computer graphics application 104, such as by the swept volume generating subsystem 106, and the surface extraction subsystem 105 of the computer graphics application 104. For illustrative purposes, the process 200 is described with reference to certain examples depicted in the figures. Other implementations, however, are possible.

At 201, the process 200 involves receiving a request to generate a swept volume of an object 108 moving along a trajectory. The request can be received, for example, through the user interface presented by the UI subsystem 107 described above with respect to FIG. 1.

At 202, the process 200 involves accessing a representation of the object 108 and trajectory information 128 associated with the movement of the object in the 3D space over a period of time. The representation of the object may be generated by another component of the computer graphics application 104 based on the input format of the object 108. Alternatively, or additionally, the swept volume generating subsystem 106 can be configured to generate the representation of the object based on the input format of the object 108.

For example, the object 108 can be represented using the signed distance field (SDF). The SDF of the object describes the distance of a given point x in the 3D space to the boundary of the object, with the sign determined by whether x is inside the object or not. in some examples, the SDF is defined to have negative values at points x inside the object. The SDF value increases as x approaches the boundary of the object where the signed distance function is zero, and the SDF has a positive value if x is outside of the object. As the object 108 moves along a trajectory, the SDF changes based on the position of the object at different time points. To describe this SDF change, an implicit function can be constructed based on the SDF of the object and the trajectory.

Denote the implicit function as g(p,S) where p is the object and S is the trajectory of the object. S is a function over time t and thus can be denoted as S(t) and t takes values from the time period for which the swept volume is to be determined. The time period can be normalized to be a continuous interval between 0 and 1 (i.e., (0, 1)) and S(t) is thus the trajectory of the object p over the normalized time period. g(p,S(t)) for a given t is the SDF of the object p at time t when moving along the trajectory. Based on these notations, the SDF of the swept volume of the object, sv(p), can be formulated as:

$$sv(p) = \min_{0<t<1} g(p, S(t)). \quad (1)$$

In other words, for a point x in the 3D space, its distance to the swept volume (i.e., the distance of point x to the closes point on the boundary or surface of the swept volume) is the minimum distance to the object as the object moves along the trajectory. The time point when the minimum SDF value for x is reached is denoted as t*, referred to as the temporal value associated with point x. Note that the temporal values for different points in the 3D space may be different.

Figure 4B:
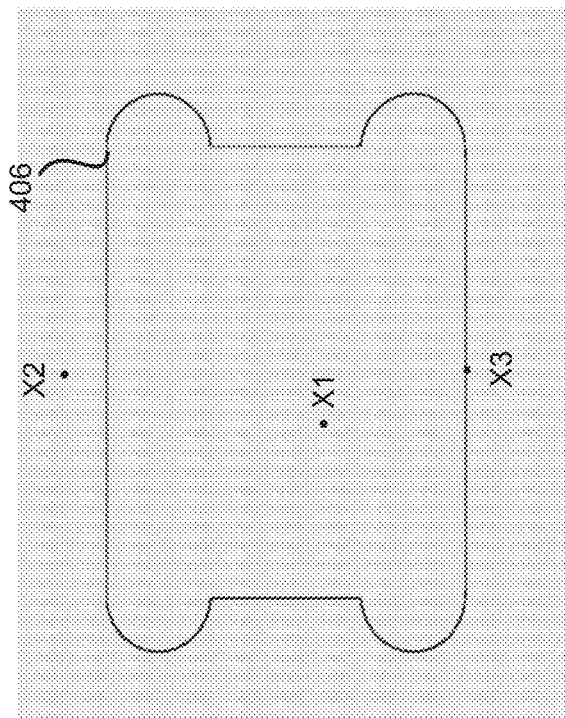
FIGS. 4A-4D depict an example of an object, the trajectory of the movement of the object, the swept volume of the object, and the voxels evaluated during the process in a two-dimensional space, according to certain embodiments disclosed herein.
Figure 4D:
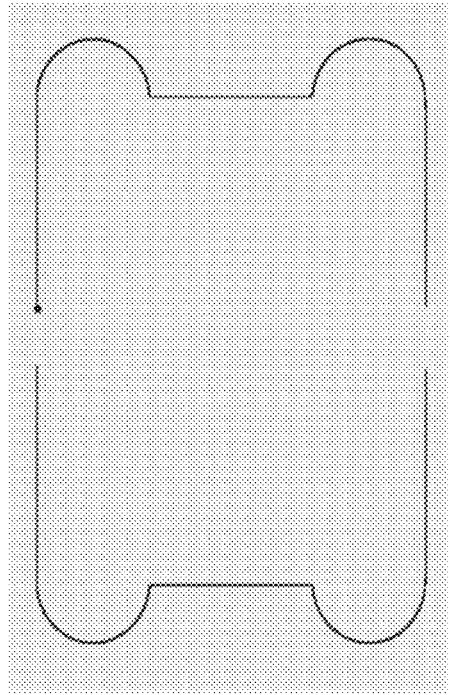
Figure 4A:
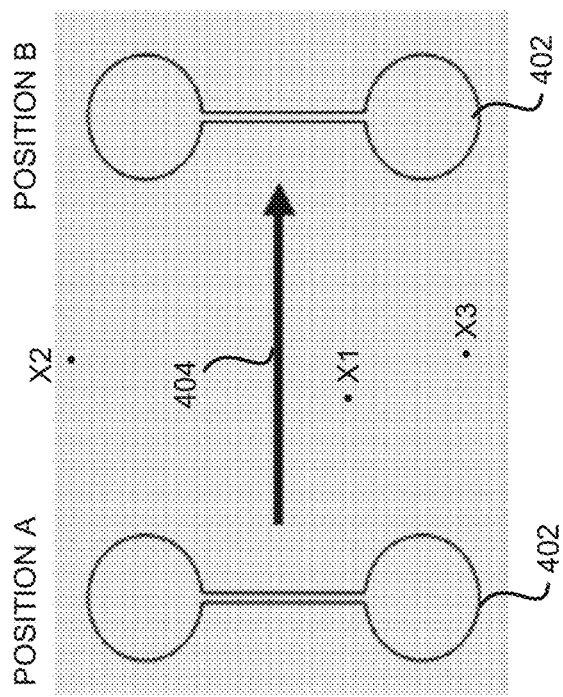

FIG. 4A shows an object 402 and the trajectory 404. When the object moves from position A to position B, the swept volume generated by the object's movement includes all the regions that the object passes through during this movement. FIG. 4B shows the swept volume 406 corresponding to the input object 402 and the trajectory 404 in FIG. 4A. As shown in the example of FIGS. 4A and 4B, if a point x1 was passed through by the object during the movement, then the SDF value of point x1 (i.e., sv(x1)) has a negative sign, which means point x1 was inside the object at some time during the time 0 to 1. The magnitude of sv(x1) is determined by the deepest position of x1 inside the object when the object passes through the point x1. Similarly, if a point x2 was never passed through by the object during the movement, then the SDF value of point x2, sv(x2), has a positive sign, which means point x2 was never inside the object during the time 0 to 1. The magnitude of sv(x2) is determined by the smallest distance from x2 to the boundary of the object when the object moves along the trajectory. The SDF of point x3 on the boundary or surface of the swept volume has a zero value. In other words, the zero level set of sv(p) is the boundary or surface of the swept volume of the object.

It should be understood that in the above example, the SDF defines the distance to be negative for points inside the object or the swept volume and positive for points outside the object or swept volume. Other definitions of the SDF can be used. For example, the distance for a point inside the object or swept volume can be defined to be positive whereas the distance for a point outside can be defined as negative. With this definition, the swept volume can be defined similarly as Eqn. (1) shown above, but with the minimum operation being replaced by the maximum operation. Other definitions of the SDF may be used and the sv(p) function can be adjusted accordingly. The following description uses the swept volume defined in Eqn. (1) as an example.

The input object can be in any format and the swept volume generating subsystem 106 or another component of the computer graphics application 104 can generate the SDF of the object based on the input format of the object 108. For example, if the input object is represented as a triangle mesh, then for any point in the 3D space, its distance to the triangle mesh can be determined by finding the closest triangle and the closest point on that triangle. The sign of the distance can be calculated by checking whether the vector going from the point to its closest point is aligned with the surface normal of the triangle mesh. As a result, every point in space can be given a signed distance to the triangle mesh and the triangle mesh is converted into the SDF. If the input object is represented in another format, such as a point cloud, any existing method for converting that format to the SDF can be used.

At 204, the process 200 involves determining the swept volume of the object in the 3D space. Given the swept volume formulation in Eqn. (1), the swept volume of the object can be identified by finding the minimum value of the SDF for each point in the 3D space over the time period (0,1). However, such a method requires evaluating all the points and is computationally prohibitive. The complexity can be reduced by sampling the temporal domain and by finding the minimum value of the SDF for each point for a set of sampled time points. The computational complexity of the sampled method becomes lower, but still too high to be used in real-life applications. In addition, the sampling introduces artifacts to the identified swept volume as will be shown in FIGS. 7C and 7D.

In the present disclosure, the swept volume is identified by evaluating a subset of the grid of voxels. For example, the swept volume generating subsystem 106 can evaluate voxels near the boundary (i.e., the enclosing surface) of the swept volume to determine the boundary or surface of the swept volume, which is equivalent to identify the swept volume. The swept volume generating subsystem 106 starts with a voxel containing a seed location known to be on the surface of the swept volume 124 and evaluates the vertices of this voxel one by one to determine whether these vertices belong to the swept volume 124 or not. The swept volume generating subsystem 106 then identifies edges that cross the surface of the swept volume 124 and include neighboring voxels that share at least one surface-crossing edge with the current voxel for evaluation. In this way, voxels containing the surface of the swept volume can be identified along with voxels neighboring or otherwise surrounding these voxels. The rest of the voxels, such as the voxels deep inside or outside the swept volume, are not evaluated. Additional details regarding determining the swept volume of the object in the 3D space are provided below with respect to FIGS. 3A-4. The computer graphics application 104 can provide the subset of voxels that have been evaluated and their associated SDF values as the output of 204.

At 206, the process 200 involves extracting the surface of the swept volume 216 as a representation of the identified swept volume based on the subset of voxels output by 204. For example, the surface extraction subsystem 105 can extract the surface using methods such as dual contouring from the output subset of voxels. The extracted surface of the swept volume can be represented as, for example, a polygon mesh. Additional details on using dual contouring to extract the surface of the swept volume 214 are provided below with respect to FIGS. 3A and 3B.

At 208, the process 200 involves outputting the surface of the swept volume. For example, the surface extraction subsystem 105 can send the representation of the swept volume surface 216 to the UI subsystem 107 where the swept volume surface is rendered by generating an image of the swept volume surface. The image of the swept volume surface is then presented in a user interface provided by the UI subsystem 107. The swept volume 214 and the representation of the swept volume surface 216 may also be sent to other components of the computing system 102 or other systems for further processing based on the applications. For example, the swept volume can be used in collision detection or path planning. Swept volume can be used for inferring the total volume that may be potentially occupied by a moving object. As such, the swept volume by a car performing parking maneuvers can be used to determine if there is a collision with another car or another object in the surrounding area. The determination can be used to decide whether the parking maneuver should be carried out, whether and how the surrounding objects should be moved to avoid a collision, and so on. Similarly, the swept volume of a moving robotic arm reveals the space occupied by the robotic arm during the movement and thus can be used to specify the areas other objects should stay clear of to avoid a collision. The swept volume can also be used in various other applications such as geometric modeling via sweeping, solid geometry (CSG) operations with sweeps, and so on.

Figure 3A:
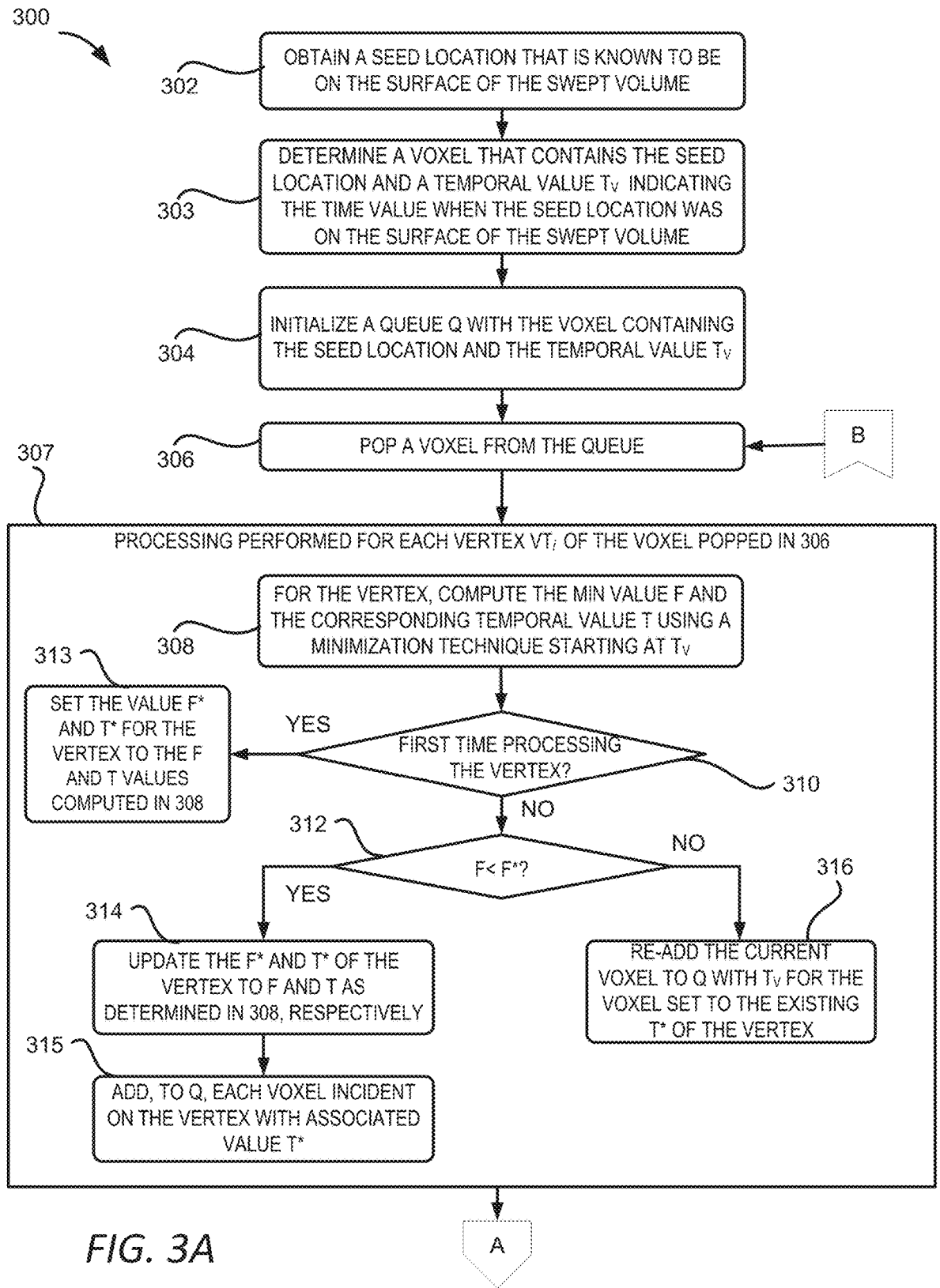
FIGS. 3A and 3B depict an example of a process for determining the swept volume of a moving object in a 3D space by evaluating voxels surrounding the surface of the swept volume, according to certain embodiments disclosed herein.
Figure 3B:
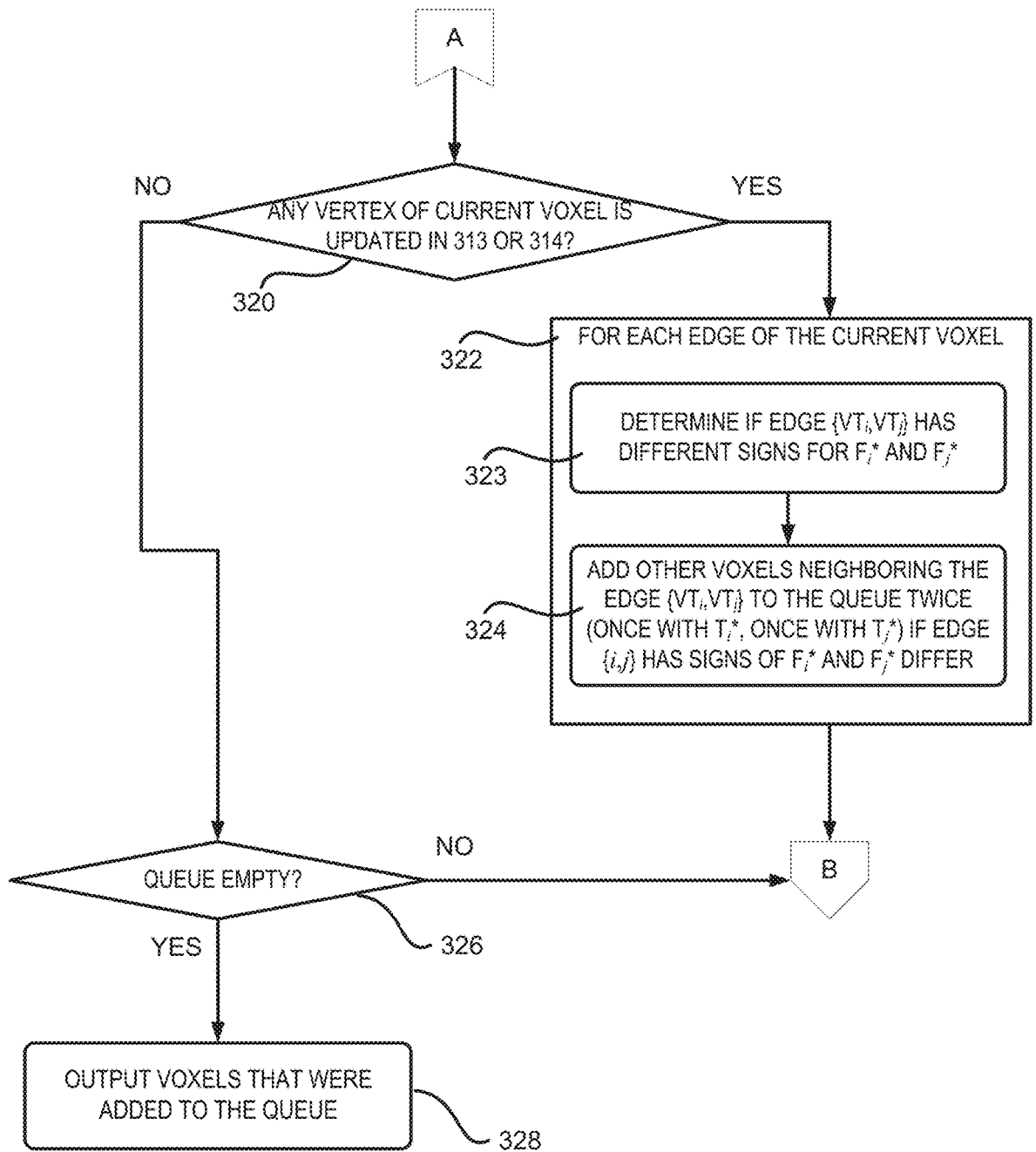
Figure 4C:
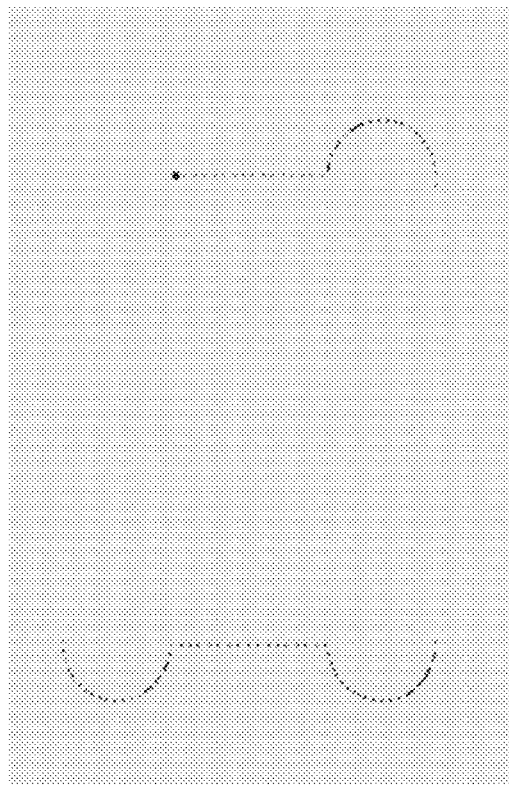
Figure 5:
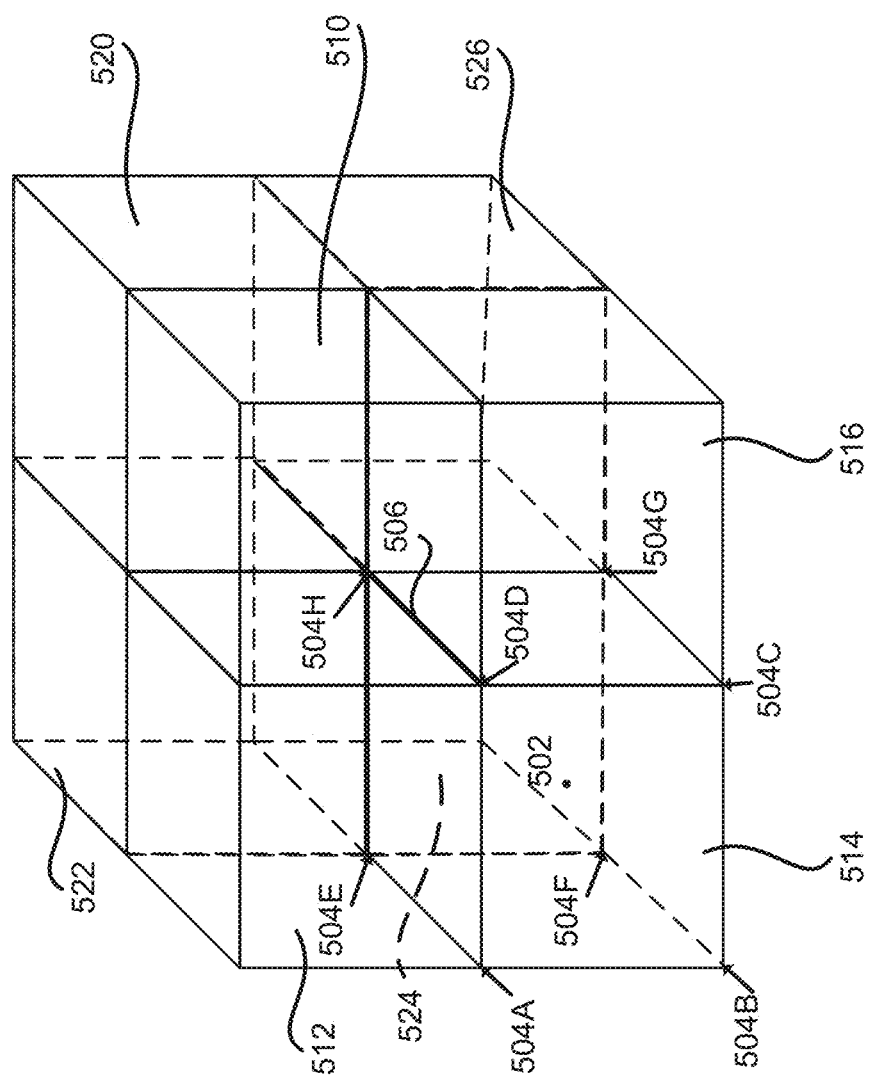
FIG. 5 depicts an example of a voxel and its neighboring voxels in the 3D space, according to certain embodiments disclosed herein.

FIGS. 3A and 3B depict an example of a process 300 for determining the swept volume of a moving object in a 3D space by evaluating voxels surrounding the surface of the swept volume, according to certain embodiments disclosed herein. The process 300 can be employed to implement 204 of FIG. 2. The process 300 can be employed to implement a step for determining a swept volume of the object in the 3D space by evaluating a subset of voxels in the grid of voxels. FIGS. 3A and 3B are described in conjunction with FIGS. 4A-5. FIGS. 4A-4D depict an example of an object, the trajectory of the movement of the object, the swept volume of the object, and the voxels evaluated during the process in a two-dimensional space, according to certain embodiments disclosed herein. FIG. 5 illustrates an example of a voxel and its neighboring voxels in the 3D space.

One or more computing devices (e.g., the computing system 102) implement operations depicted in FIGS. 3A and 3B by executing suitable program code (e.g., the computer graphics application 104). The software or program code may be stored on a non-transitory storage medium (e.g., on a memory device). The process depicted in FIGS. 3A and 3B and described below is intended to be illustrative and non-limiting. Although FIGS. 3A and 3B depict the various processing blocks occurring in a particular sequence or order, this is not intended to be limiting. In certain alternative embodiments, the blocks may be performed in some different order or some blocks may also be performed in parallel. In certain embodiments, such as in the embodiment depicted in FIG. 1, the process depicted in FIGS. 3A and 3B may be performed by the computer graphics application 104, such as by the swept volume generating subsystem 106 of the computer graphics application 104. For illustrative purposes, the process 300 is described with reference to certain examples depicted in the figures. Other implementations, however, are possible.

At 302, the process 300 involves obtaining a seed location x that is known to be on the surface of the swept volume. In other words, $sv(x)=g(x,S(t_x))=0$. The seed location can be obtained by identifying points whose velocity and normal vector are orthogonal, which is a necessary condition for lying on the sweep's surface. For example, time is sampled at coarse regular intervals (e.g., 10 intervals). For each time $t_i$, 100 random points are drawn on the object. For each point, if the orthogonality condition is satisfied up to some tolerance (i.e., dot product of the velocity and normal vector is less than 0.01), the point is identified as the seed location. In alternative or additional example, the seed location can be input via a user interface of the UI subsystem 107, such by a user specifying the seed location in the 3D space. In some examples, multiple seed locations can be identified.

At 303, the process 300 involves the swept volume generating subsystem 106 determining a voxel in the grid of voxels that contains the seed location identified in 302. In the above example of identifying the seed location, for each time $t_i$, the points for which the orthogonality condition is satisfied, the voxels containing these points are identified. $t_i$ indicates the time value when the seed location was on the surface of the swept volume and is saved as the temporal value of the seed location.

At 304, the process 300 involves initializing a queue with the voxel containing the seed location and the temporal value of the seed location identified in 303. The temporal value of the seed location is referred to as the temporal value associated with the voxel and denoted as $t_v$. As such, each voxel in the queue has a temporal value $t_v$ associated therewith. As will be discussed below in detail, the temporal value $t_v$ can be used as an initial guess of the temporal values of the vertices of the voxel (e.g., to be used as an initial point in the optimization of the vertices' values). FIG. 5 shows several adjacent voxels in the 3D space. In this example, for a seed location 502, the swept volume generating subsystem 106 can identify voxel 514 as the voxel that contains the seed location 502. The voxel 514 and the temporal value associated with the seed location 502 are added to the queue.

Referring back to FIG. 3, at 306, the process 300 involves retrieving or popping a voxel from the queue. Since a queue operates as a first-in-first-out data structure, a first voxel pushed into the queue earlier than a second voxel will be retrieved or popped out earlier than the second voxel.

For the popped voxel, the swept volume generating subsystem 106 performs 307, which includes 308-316, for each vertex $vt_i$ of this voxel. In the example shown in FIG. 5, each voxel has eight vertices (e.g., voxel 514 has eight vertices 504A-H). The swept volume generating subsystem 106 evaluates each of these eight vertices in 307 as described below. At 308, the swept volume generating subsystem 106 computes the minimum SDF value $f_{vt_i}$* and the temporal value $t_{vt_i}$* for vertex $vt_i$. That is, $$f^*_{vt_i} = \min_{0<t<1} f(vt_i, t), \quad (2)$$

$$t^*_{vt_i} \operatorname{argmin}_{0<t<1} f(vt_i, t),$$

Here, f ($vt_i$, t)=g($vt_i$,S(t)) is a function showing the SDF value of the vertex $vt_i$ as time t changes. $f_{vt_i}$* is the minimum SDF value of the vertex $vt_i$ during the movement of the object and $f_{vt_i}$* is the corresponding temporal value of the vertex $vt_i$. In some examples, the swept volume generating subsystem 106 uses the gradient descent method to solve the minimization problem in Eqn. (2) and to generate an estimated minimum SDF value $f_{vt_i}$ and the corresponding temporal value $t_{vt_i}$ as the time value when the estimated minimum SDF value $f_{vt_i}$ is achieved. The initial search point of the gradient descent method can be set to the temporal value $t_v$ associated with the current voxel.

At 310, the process 300 involves determining whether this is the first time the current vertex is evaluated. If not, the process involves determining at 312 whether the currently estimated minimum SDF value $f_{vt_i}$ is smaller than a stored minimum SDF value $f_{vt_i}$*. If so, at 314 the swept volume generating subsystem 106 updates the stored minimum SDF value $f_{vt_i}$* with $f_{vt_i}$ and the stored temporal value $t_{vt_i}$* with $t_{vt_i}$. That is $f_{vt_i}$*=$f_{vt_i}$ and $f_{vt_i}$*=$t_{vt_i}$. The swept volume generating subsystem 106 further adds the neighboring voxels that share vertex $vt_i$ with the current voxel into the queue along with the temporal value $f_{vt_i}$*. In the example shown in FIG. 5, the neighboring voxels that share vertex 504H with voxel 514 include voxels 510, 512, 516, 520, 522, 524, and 526. The temporal value $t_{vt_i}$* of the vertex $vt_i$ is added to the queue along with the neighboring voxels as the temporal value associated with the respective voxels. In this way, when solving the minimization problem of Eqn. (2) for the neighboring voxels, the temporal value $t_{vt_i}$* of the current voxel will be used as the initial search point. This can significantly reduce the amount of computation involved in solving the minimization problem because the temporal values (i.e., the time points when the minimum SDF values are achieved) for spatially close points are also close in value. In addition, using the temporal value of the neighboring point can help to avoid falling into local minima when solving the optimization problem in Eqn. (2), especially for objects with much more complicated shapes or trajectories that involve rotations.

If at 312, the swept volume generating subsystem 106 determines that the calculated minimum SDF value $f_{vt_i}$ is not smaller than the stored minimum SDF value $f_{vt_i}$*, the swept volume generating subsystem 106 re-adds the current voxel back to the queue with the stored temporal value $t_{vt_i}$*. When $f_{vt_i} \geq f_{vt_i}$*, it is likely that the current calculation of the $f_{vt_i}$ falls in a local minimum and re-adding the current voxel back to the queue with the stored temporal value can help to get out of the local minimum. If at 310, it is determined that this is the first time the current vertex $v_i$ is evaluated, the swept volume generating subsystem 106 sets the stored value $f_{vt_i}$* and $t_{vt_i}$* to be the values $f_{vt_i}$ and $t_{vt_i}$ determined in 308, respectively.

After 307 has been performed for each vertex of the popped voxel, the process 300 involves determining at 320 that if any vertex of the current voxel is updated in 313 or 314. If so, the process 300 involves performing 322 for each edge of the current voxel. In 322, for an edge {$vt_i$, $vt_j$}, the swept volume generating subsystem 106 determines if this edge has different signs for $f_{vt_i}$* and $f_{vt_j}$*. In other words, the swept volume generating subsystem 106 determines whether signs of the minimum SDF values $f_{vt_i}$* and $f_{vt_j}$* of the two vertices $vt_i$ and $vt_j$ connected by the edge differ, that is, whether the edge is a surface-crossing edge. For example, the swept volume generating subsystem 106 evaluates whether one of $f_{vt_i}$* and $f_{vt_j}$* is positive and the other one is negative. If so, this edge {$vt_i$, $vt_j$} is a surface-crossing edge.

At 324, if the edge {$vt_i$, $vt_j$} is a surface-crossing edge, other neighboring voxels incident on this edge (i.e., having edge {$vt_i$, $vt_j$} as one of their edges) are added to the queue. When adding such a neighboring voxel to the queue, it is added to the queue twice: once with the associated temporal value set to $t_{vt_i}$* and once with the associated temporal value set to $t_{vt_j}$*. In the example shown in FIG. 5, assume voxel 514 is the current voxel and edge 506 connecting vertex 504D and 504H is a surface-crossing edge. In this example, neighboring voxels 510, 512, and 516 share the same edge 506 with voxel 514 and thus these three voxels are added to the queue. Each of the neighboring voxels 510, 512, and 516 is added to the queue twice, once with the temporal value of $vt_i$ (i.e., $f_{vt_i}$*) and once with the temporal value of $vt_j$ (i.e., $f_{vt_j}$*). As a result, six voxel and temporal value combinations are added to the queue for edge {$vt_i$, $vt_j$}. The neighboring voxels for other surface-crossing edges can also be added to the queue in a similar way.

After 322 is performed for each edge of the current voxel, at 326, the process 300 involves determining whether the queue is empty. If not, the process 300 involves popping a voxel from the queue at 306 and repeating the process as described above. If the queue is empty, the swept volume generating subsystem 106 outputs the subset of voxels that have been evaluated during the process, that is, the voxels that have been added to the queue at least once. For each voxel in the subset of voxels, the output includes the minimum SDF value $f_{vt_i}$* and the associated temporal value $t_{vt_i}$* for each vertex $vt_i$ of the voxel.

The process 300 starts with one or more seed locations and gradually expands the evaluation to voxels containing the surface and their neighboring voxels. As shown in FIGS. 4C and 4D, this process eventually leads to the entire surface being evaluated and thus the swept volume is determined.

For swept volume determined using the process 300, the dual contouring method can be utilized to extract the surface of the swept volume from the output subset of voxels. This method considers each voxel edge {$vt_1$, $vt_2$} crossing the boundary or the surface of the swept volume, with minimum SDF values $f_{vt_1}$<0<$f_{vt_2}$ and performs a local search to find the point $x_s$ on which the edge crosses the outer surface (f($x_s$) =0). Dual contouring then uses position and gradient information at this point to compute a dual vertex lying in the edge's neighboring (primary) voxel cells. Denote the temporal values associated with $vt_i$ and $vt_2$ as $t_1$* and $t_2$*, respectively. When the binary search procedures ask for the minimum value f* of point $x_s$, the gradient descent over f($x_s$, t)=g($x_s$, S(t)) can be performed, initializing from both $t_1$* and $t_2$* and choosing the best result.

Dual contouring calculates the spatial gradient $\partial f^*/\partial x$ (surface normal up to length) at the identified surface points $x_s$. In this case, $$\frac{df^*}{dx} = \frac{\partial f^*}{\partial x} + \frac{\partial t^*}{\partial x}\frac{\partial f^*}{\partial t^*}. \qquad (3)$$

Being at a minima $t_s^*$, the rightmost term will vanish. Thus it is sufficient to compute only the spatial gradient off evaluated at time $t_s^*$.

Figure 6:
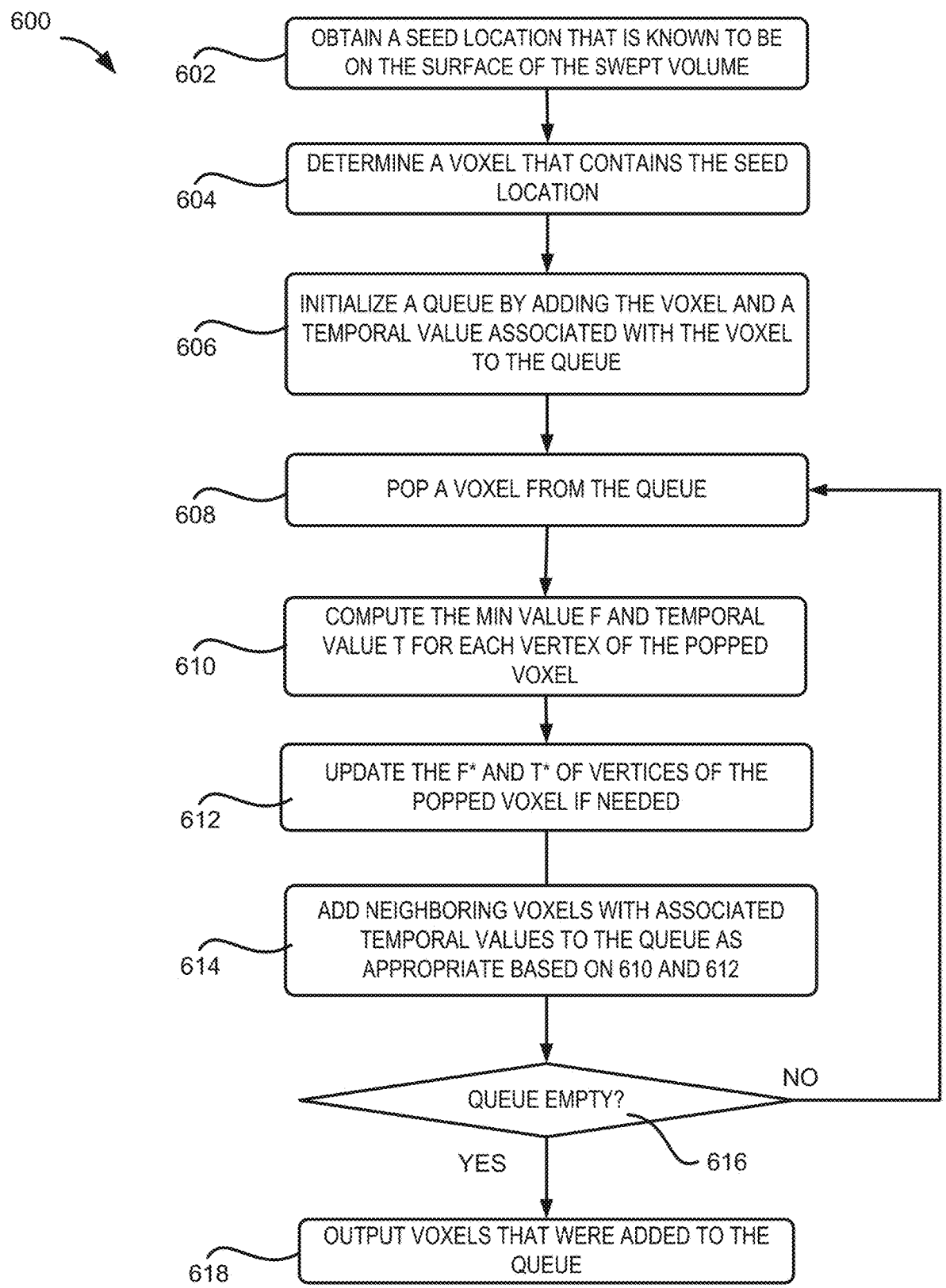
FIG. 6 depicts another example of a process for determining the swept volume of a moving object in a 3D space by evaluating voxels surrounding the surface of the swept volume, according to certain embodiments disclosed herein.

FIG. 6 depicts another example of a process 600 for determining the swept volume of a moving object in a 3D space by evaluating voxels surrounding the surface of the swept volume, according to certain embodiments disclosed herein. The process 600 can also be employed to implement a step for determining a swept volume of the object in the 3D space by evaluating a subset of voxels in the grid of voxels. One or more computing devices (e.g., the computing system 102) implement operations depicted in FIG. 6 by executing suitable program code (e.g., the computer graphics application 104). The software or program code may be stored on a non-transitory storage medium (e.g., on a memory device). The process depicted in FIG. 6 and described below is intended to be illustrative and non-limiting. Although FIG. 6 depicts the various processing blocks occurring in a particular sequence or order, this is not intended to be limiting. In certain alternative embodiments, the blocks may be performed in some different order or some blocks may also be performed in parallel. In certain embodiments, such as in the embodiment depicted in FIG. 1, the process depicted in FIG. 6 may be performed by the computer graphics application 104, such as by the swept volume generating subsystem 106 of the computer graphics application 104. For illustrative purposes, the process 600 is described with reference to certain examples depicted in the figures. Other implementations, however, are possible.

At 602, the swept volume generating subsystem 106 obtains one or more seed locations that are known to be on the surface of the swept volume of the object with a given trajectory. The swept volume generating subsystem 106 can determine the seed locations based on the SDF of the object and trajectory or obtained from the UI subsystem 107 as described above with respect to FIG. 3A.

At 604, the swept volume generating subsystem 106 determines the voxels that contain the seed locations obtained in 602. At 606, the swept volume generating subsystem 106 initializes a queue by adding the voxels identified in 604 to the queue. For each voxel added to the queue, a temporal value associated with the voxel is also added to the queue along with the voxel. In some examples, the temporal value associated with a voxel containing a seed location is the time value when the seed location is on the surface of the swept volume.

At 608, the swept volume generating subsystem 106 pops a voxel from the queue. As the queue is a first-in-first-out data structure, the voxel popped from the queue is the earliest voxel, among the voxels currently in the queue, added to the queue. At 610, the swept volume generating subsystem 106 computes an estimated minimum SDF value f and the associated temporal value t for each vertex of the popped voxel. The temporal value t indicates the time point when the minimum SDF value f is achieved. The estimated minimum SDF value f and the associated temporal value t for each vertex can be found by solving a minimization problem over an implicit function describing the changes of the SDF of the grid of voxels over time as the object moves along the trajectory.

At 612, the swept volume generating subsystem 106 updates the minimum SDF value f* and the associated temporal value t* for each vertex if needed. In some examples, each vertex has a stored minimum SDF value f* and the associated temporal value t*. The swept volume generating subsystem 106 can compare the estimated minimum SDF value f with the stored minimum SDF value f*. If the estimated minimum SDF value f is smaller than the stored minimum SDF value f*, then the swept volume generating subsystem 106 updates the stored minimum SDF value f* to be the estimated minimum SDF value f and updates the stored temporal value t* with t.

At 614, the swept volume generating subsystem 106 adds neighboring voxels of the popped voxel along with the associated temporal values to the queue as appropriate based on the results in 610 and 612. For example, if the stored minimum SDF value f* and associated t* for a particular vertex of the current voxel was updated in 612, the swept volume generating subsystem 106 adds neighboring voxels that share the particular vertex with the current voxel to the queue. The temporal value t* of the particular vertex can be used as the temporal value associated with the neighboring voxels being added to the queue. In a further example, if an edge of the current voxel is a surface-crossing edge (i.e., the stored minimum SDF values of the two vertices have different signs), neighboring voxels sharing the same edge are also added to the queue along with the temporal value for one or both vertices.

At 616, the swept volume generating subsystem 106 determines whether the queue is empty. If not, the swept volume generating subsystem 106 pops another voxel in 608 and repeats 610-614. If the queue is empty, the swept volume generating subsystem 106 outputs the swept volume by outputting voxels that have been evaluated during the process, i.e., voxels that were added to the queue at least once.

Figure 7B:
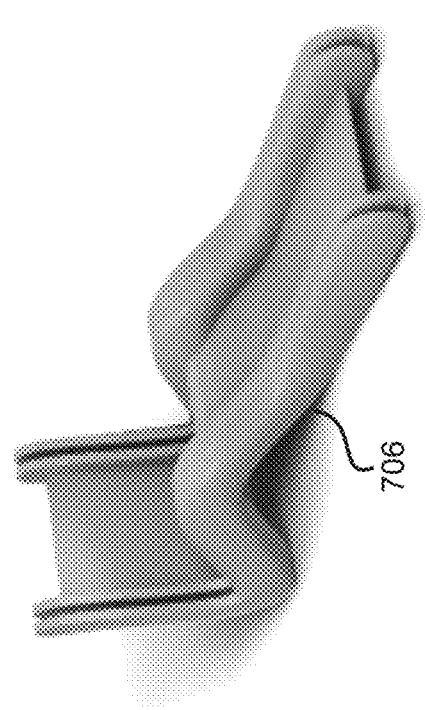
FIGS. 7A-D depicts an example of an object, the trajectory of the movement of the object, the swept volume of the object generated according to certain embodiments disclosed herein, and the swept volumes of the object generated according to a prior art technique.
Figure 7A:
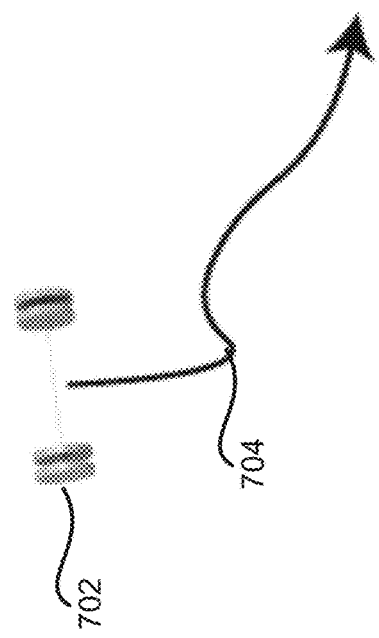
Figure 7D:
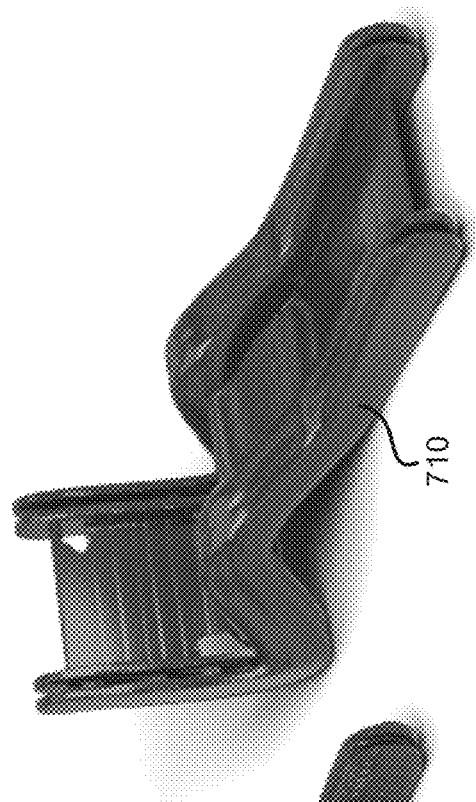
Figure 7C:
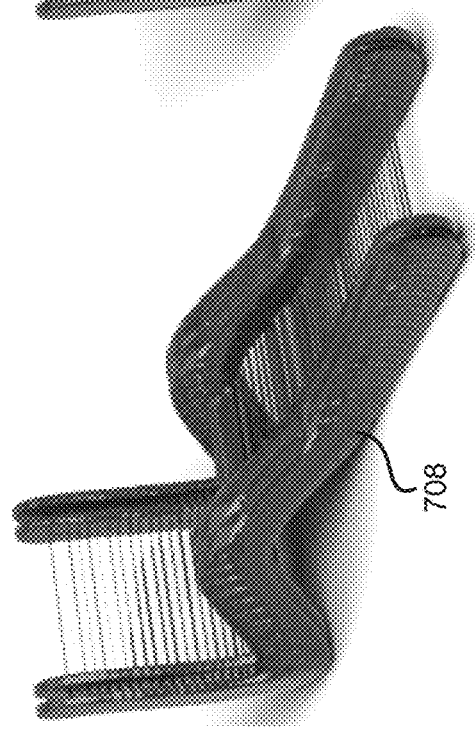

FIGS. 7A-7D depict examples of swept volumes generated based on the input object and its trajectory according to certain embodiments disclosed herein and prior art techniques. FIG. 7A shows a 3D dumbbell 702 as the input object and the trajectory 704 of the movement of the dumbbell 702. FIG. 7B shows the swept volume generated according to the techniques presented here. Generating the swept volume shown in FIG. 7B involves approximately 26 million queries. FIGS. 7C and 7D show the swept volumes 708 and 710 generated by a prior art method which generates the swept volume by sampling the temporal domain. Approximately 340 million queries are involved in generating the swept volume shown in FIG. 7C and approximately 2137 million queries are involved in generating the swept volume shown in FIG. 7D. As can be seen from FIGS. 7A-7D, the swept volume determination method proposed herein can identify the swept volume of an input object with significantly lower computational complexity (e.g., only 7.6% of the computations involved in the FIG. 7C and 1.2% of the computations involved in FIG. 7D). The swept volume determined using the techniques presented herein also has much higher accuracy than the prior arts. The swept volume 706 accurately reflects the actual swept volume of the object 702, whereas the swept volumes 708 and 710 have clear artifacts and errors.

Figure 8:
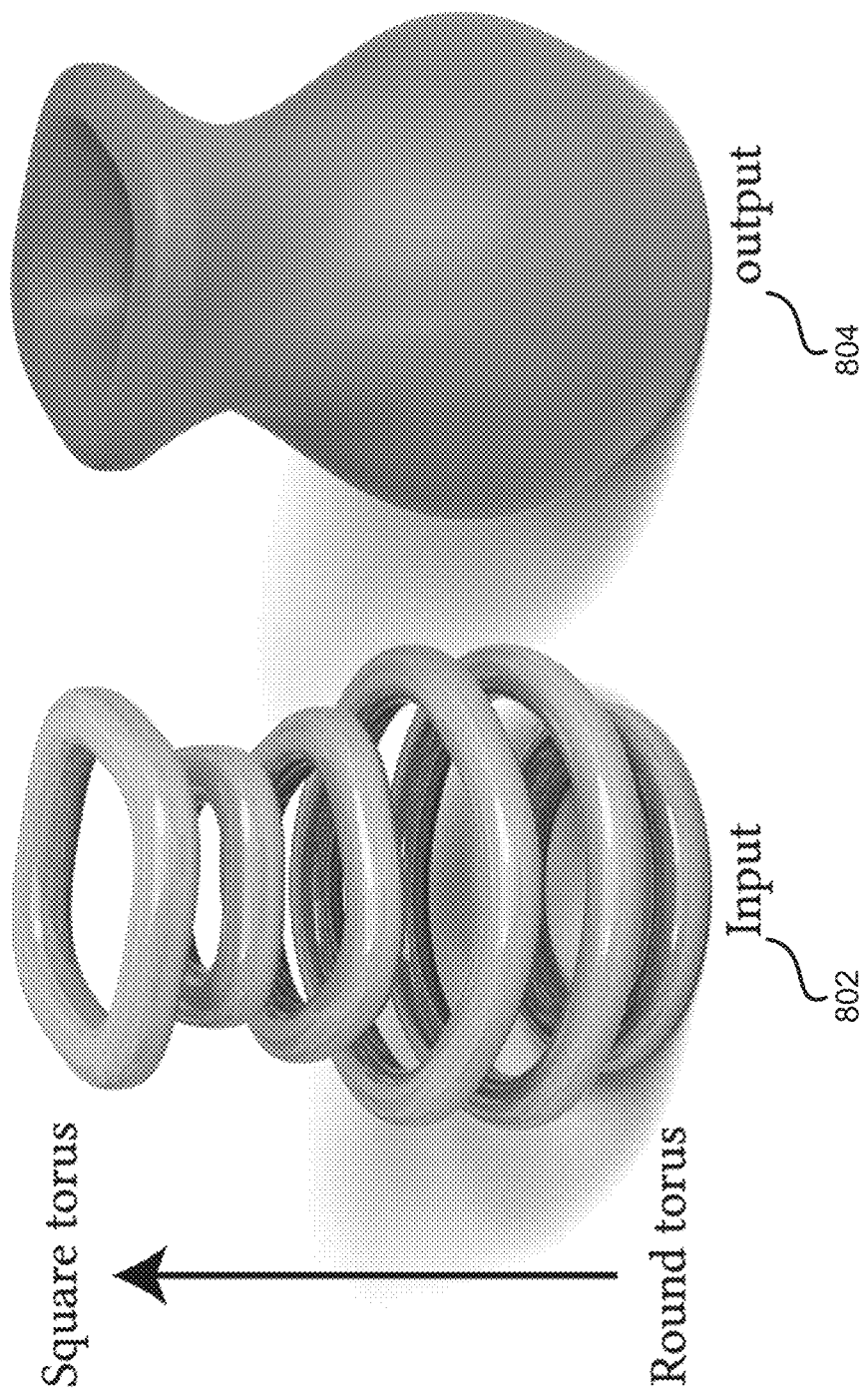
FIG. 8 depicts an example of an object whose size and shape change over time during the movement and the generated swept volume, according to certain embodiments disclosed herein.

It should be noted that the above process for determining the swept volume of a moving object applies to any solid shape object that has a continuous SDF. Thus, the shape and the size of the object may be changing during the movement as long as the SDF of the object can be obtained. FIG. 8 shows an example of an input object 802 whose shape and size changes during the movement and the output swept volume generated according to certain embodiments disclosed herein. The input object 802 has a round torus at the beginning of the movement. As time goes by, the size of the object is increased, then reduced, and then increased again. Further, the shape of the object changes from a round torus to a square torus. The output 804 is the generated swept volume for the object 802, which is a vase with a round bottom and a square top. In addition to size and shape, the input object can have any time-evolving SDF, as long as it is differentiable with respect to time.

In the above example, voxels and vertices may be visited many times during the queue processing. To avoid re-optimizing the same time value over and over again for the same vertex, the one-dimensional nature of the t* optimization can be utilized. Consider that a vertex has previously started a descent with value $t_0$ and converged to the nearest local minimizer $t_1$. If this vertex is visited again and is requested to start a descent with a value $t_2$ that lies in the interval spanned by $t_0$ and $t_1$, then the numerical descent can be skipped and $t_1$ can be returned immediately as $t_2$ will lie along the way down from $t_0$ to $t_1$.

Figure 9:
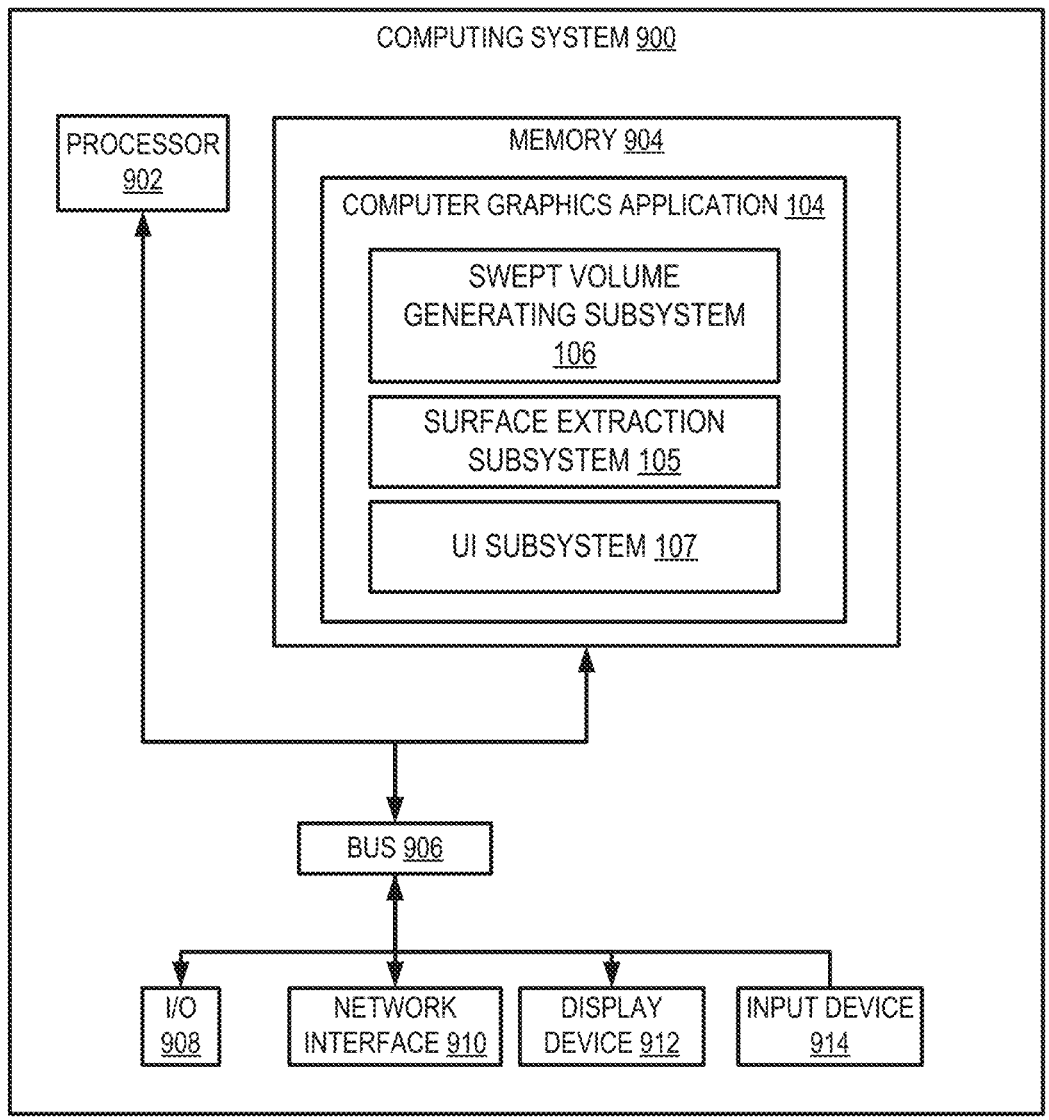
FIG. 9 depicts an example of a computing system that executes an image editor for performing certain embodiments disclosed herein.

Any suitable computing system or group of computing systems can be used for performing the operations described herein. For example, FIG. 9 depicts an example of a computing system 900 that can implement the computing environment of FIG. 1. In some embodiments, the computing system 900 includes a processing device 902 that executes the computer graphics application 104 including the swept volume generating subsystem 106, the surface extraction subsystem 105, and the UI subsystem 107, a memory 904 that stores various data computed or used by the computer graphics application 104, an input device 914 (e.g., a mouse, a stylus, a touchpad, a touchscreen, etc.), and a display device 912 that displays graphical content generated by the computer graphics application 104. For illustrative purposes, FIG. 9 depicts a single computing system on which the computer graphics application 104 is executed, and the input device 914 and display device 912 are present. But these applications, datasets, and devices can be stored or included across different computing systems having devices similar to the devices depicted in FIG. 9.

The depicted example of a computing system 900 includes a processing device 902 communicatively coupled to one or more memory devices 904. The processing device 902 executes computer-executable program code stored in a memory device 904, accesses information stored in the memory device 904, or both. Examples of the processing device 902 include a microprocessor, an application-specific integrated circuit ("ASIC"), a field-programmable gate array ("FPGA"), or any other suitable processing device. The processing device 902 can include any number of processing devices, including a single processing device.

The memory device 904 includes any suitable non-transitory computer-readable medium for storing data, program code, or both. A computer-readable medium can include any electronic, optical, magnetic, or other storage devices capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 900 may also include a number of external or internal devices, such as an input device 914, a display device 912, or other input or output devices. For example, the computing system 900 is shown with one or more input/output ("I/O") interfaces 908. An I/O interface 908 can receive input from input devices or provide output to output devices. One or more buses 906 are also included in the computing system 900. The buses 906 communicatively couples one or more components of a respective one of the computing system 900.

The computing system 900 executes program code that configures the processing device 902 to perform one or more of the operations described herein. The program code includes, for example, the computer graphics application 104 or other suitable applications that perform one or more operations described herein. The program code may be resident in the memory device 904 or any suitable computer-readable medium and may be executed by the processing device 902 or any other suitable processor. In some embodiments, all modules in the computer graphics application 104 are stored in the memory device 904, as depicted in FIG. 9. In additional or alternative embodiments, one or more of these modules from the computer graphics application 104 are stored in different memory devices of different computing systems.

In some embodiments, the computing system 900 also includes a network interface device 910. The network interface device 910 includes any device or group of devices suitable for establishing a wired or wireless data connection to one or more data networks. Non-limiting examples of the network interface device 910 include an Ethernet network adapter, a modem, and/or the like. The computing system 900 is able to communicate with one or more other computing devices (e.g., a computing device that receives inputs for the computer graphics application 104 or displays outputs of the computer graphics application 104) via a data network using the network interface device 910.

An input device 914 can include any device or group of devices suitable for receiving visual, auditory, or other suitable input that controls or affects the operations of the processing device 902. Non-limiting examples of the input device 914 include a touchscreen, stylus, a mouse, a keyboard, a microphone, a separate mobile computing device, etc. A display device 912 can include any device or group of devices suitable for providing visual, auditory, or other suitable sensory output. Non-limiting examples of the display device 912 include a touchscreen, a monitor, a separate mobile computing device, etc.

Although FIG. 9 depicts the input device 914 and the display device 912 as being local to the computing device that executes the computer graphics application 104, other implementations are possible. For instance, in some embodiments, one or more of the input device 914 and the display device 912 can include a remote client-computing device that communicates with the computing system 900 via the network interface device 910 using one or more data networks described herein.

Figure 10:
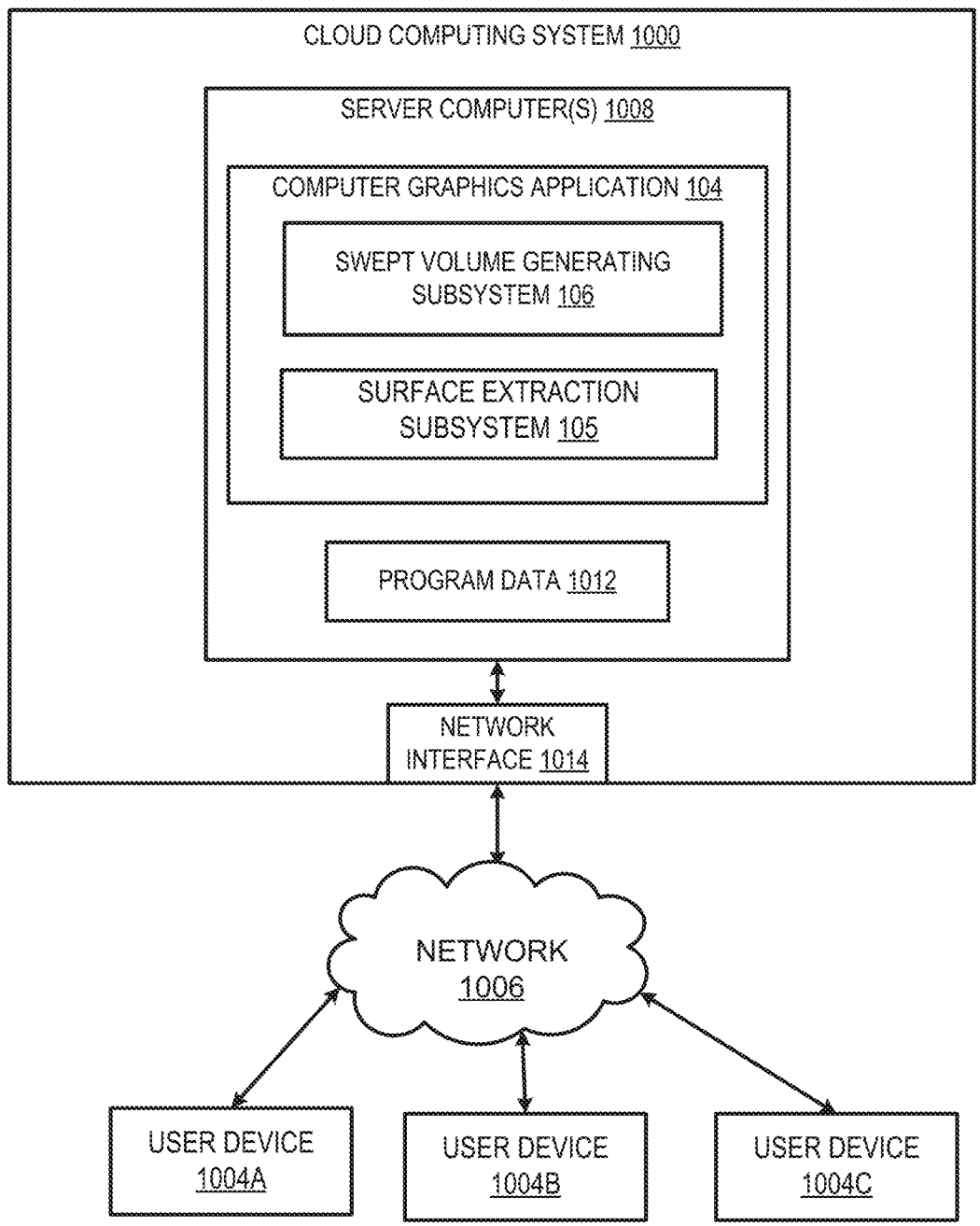
FIG. 10 depicts an example of a cloud computing system for implementing certain embodiments disclosed herein.

In some embodiments, the functionality provided by the computing system 102 may be offered as cloud services by a cloud service provider. For example, FIG. 10 depicts an example of a cloud computing system 1000 offering a computer graphics service as a cloud service that can be subscribed to by one or more subscribers. Subscribers can interact with the cloud computing system via one or more user devices 1004A, 1004B, and 1004C that are capable of communicating with the cloud computing system 1000 via a communication network 1006. Communication network 1006 may be any type (or types) of network familiar that facilitates communications between cloud computing system 1000 and the user devices. Communication network 1006 may support various data communication protocols, including without limitation wired and wireless protocols. Merely by way of example, network 1106 can be the Internet, a local area network (LAN), an Ethernet, a wide-area network (WAN), a virtual private network (VPN), an intranet, an extranet, a public switched telephone network (PSTN), and the like.

The cloud computing system 1000 also includes a network interface device 1014 that enables communications to and from cloud computing system 1000. In certain embodiments, the network interface device 1014 includes any device or group of devices suitable for establishing a wired or wireless data connection to network 1006. Non-limiting examples of the network interface device 1014 include an Ethernet network adapter, a modem, and/or the like. The cloud computing system 1000 is able to communicate with the user devices 1004A, 1004B, and 1004C via the network 1006 using the network interface device 1014.

In certain embodiments, the automatic pose synchronization functionality may be offered as a cloud service under a Software as a Service (SaaS) model. One or more users may subscribe to the image editing service offering the pose synchronization functionality, and the cloud computing system performs the processing to provide the image editing service to subscribers.

The cloud computing system may include one or more remote server computers 1008 that provide the cloud services offered by cloud computing system 1000. The remote server computers 1008 include any suitable non-transitory computer-readable medium for storing program code (e.g., a computing system 102) and program data 1012, or both, which is used by the cloud computing system 1000 for providing the cloud services. A non-transitory computer-readable medium can include any electronic, optical, magnetic, or other storage devices capable of storing computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 1108 can include volatile memory, non-volatile memory, or a combination thereof.

The one or more of the servers 1008 can include one or more processors that are configured to execute the program code to perform one or more of the operations that provide computer graphics services, including the ability to generate swept volume for an object moving in a 3D space. As depicted in the embodiment in FIG. 10, the one or more servers providing the services to generate swept volume for an object moving in a 3D space may implement a computer graphics application 104 which includes a swept volume generating subsystem 106 and a surface extraction subsystem 105, and other subsystems. Any other suitable systems or subsystems that perform one or more operations described herein (e.g., one or more development systems for configuring an interactive user interface) can also be implemented by the cloud computing system 1000.

In certain embodiments, the cloud computing system 1000 may implement the services by executing program code and/or using program data 1012, which may be resident in a memory device of the server computers 1008 or any suitable computer-readable medium and may be executed by the processors of the server computers 1008 or any other suitable processor.

In some embodiments, the program data 1012 includes program code executable by the one or more processors, and other data (e.g., metadata, object models) used for providing the swept volume determination functionality. Examples of the data include image data, object data, SDF data, trajectory data, etc. In some embodiments, one or more of data, models, and functions are stored in the same memory device. In additional or alternative embodiments, one or more of the programs, data, models, and functions described herein are stored in different memory devices accessible via the data network 1006.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components, or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A computer-implemented method in which one or more computing systems perform operations comprising:
    determining, from a grid of voxels representing a three-dimension (3D) space, a first subset of voxels comprising voxels for generating a surface of a swept volume for an object in the 3D space due to movement of the object in the 3D space along a trajectory from a first location in the 3D space to a second location in the 3D space over a time period, the determining performed by processing only a second subset of voxels from the grid of voxels, the second subset of voxels comprising the first subset of voxels, wherein:
        the second subset of voxels comprises voxels containing the surface of the swept volume and voxels surrounding the surface of the swept volume, and excludes at least one voxel inside the swept volume and at least one voxel outside the swept volume,
        a number of voxels in the first subset of voxels is less than a number of voxels in the grid of voxels,
        a number of voxels in the second subset of voxels is less than the number of voxels in the grid of voxels,
        the number of voxels in the first subset of voxels is less than the number of voxels in the second subset of voxels,
        processing the second subset of voxels comprises:
            determining the surface of the swept volume by identifying, from the second subset of voxels, a voxel that has a vertex with a minimum signed distance field (SDF) value equal to zero or has a first vertex with a minimum SDF value greater than zero and a second vertex with a minimum SDF value smaller than zero, determining the surface of the swept volume further comprising:
                identifying a first voxel containing a seed location that is on the surface of the swept volume,
                determining an edge of the first voxel between a first vertex of the first voxel having a minimum SDF value greater than zero and a second vertex of the first voxel having a minimum SDF value smaller than zero, and
                identifying a neighboring voxel sharing the edge with the voxel for processing; and
    generating a representation of the surface of the swept volume for the object using the first subset of voxels.

2. The computer-implemented method of claim 1, wherein the representation of the object comprises a signed distance field (SDF) of the object defined over the grid of voxels, and wherein each vertex of a voxel in the grid of voxels has an SDF value at a given time point indicating a distance from the vertex to the object at the given time point.

3. The computer-implemented method of claim 2, wherein processing the second subset of voxels comprises:
    determining, by using an implicit function determined by the SDF of the object and the trajectory, a minimum SDF value for each vertex of the second subset of voxels and a temporal value indicating a time point over the time period when the minimum SDF value is achieved.

4. The computer-implemented method of claim 3, wherein the implicit function describes changes of the SDF value for each vertex of the grid of voxels over the time period as the object moves along the trajectory.

5. The computer-implemented method of claim 3, wherein processing the second subset of voxels comprises:
    for each vertex of the first voxel, calculating, based on the implicit function, the minimum SDF value for the vertex and the temporal value at which the minimum SDF value for the vertex is achieved;
    calculating the minimum SDF value and the temporal value for each vertex of a neighboring voxel containing the edge.

6. The computer-implemented method of claim 3, wherein calculating the minimum SDF value and the temporal value for a vertex of a voxel is performed by applying a gradient descent method to the implicit function at the vertex and over the time period, and wherein an initial point for the gradient descent method is the temporal value associated with the voxel.

7. The computer-implemented method of claim 6, wherein the time period is continuous and the implicit function is defined over the continuous time period.

8. The computer-implemented method of claim 2, wherein processing the second subset of voxels comprises:
    for the seed location identified to be on the surface of the swept volume at a first time, determining, from the grid of voxels, the first voxel containing the seed location;
    adding the first voxel along with the first time to a process set of voxels; and
    for a voxel in the process set of voxels,
        calculating a minimum SDF value for a vertex of the voxel and a temporal value indicating a time point over the time period when the minimum SDF value is achieved identifying a vertex of the voxel;
        in response to determining that the vertex is processed for a first time, associating the calculated minimum SDF value and the calculated temporal value with the voxel;
        in response to determining that the calculated minimum SDF value is smaller than a minimum SDF value associated with the voxel, associating the calculated minimum SDF value and the calculated temporal value with the voxel, and adding a neighboring voxel that shares the vertex with the voxel to the process set; and in response to determining that the calculated minimum SDF value is no smaller than the minimum SDF value associated with the voxel, adding the voxel to the process set of voxels.

9. The computer-implemented method of claim 8, wherein processing the second subset of voxels further comprises, for the voxel in the process set of voxels:
in response to determining that a vertex of the voxel is processed,
identifying an edge of the voxel, wherein a sign of the minimum SDF value associated with a first vertex of the edge and a sign of the minimum SDF value associated with a second vertex of the edge are different; and
adding a neighboring voxel sharing the edge with the voxel to the process set of voxels.

10. The computer-implemented method of claim 2, wherein a shape or a size of the object changes over the time period, and wherein the SDF values for vertices of the grid of voxels are determined based on respective shapes or sizes of the object over the time period.

11. The computer-implemented method of claim 1, wherein generating the representation of the surface of the swept volume comprises generating a polygon mesh for an outer surface of the swept volume.

12. A system comprising:
a processing device; and
a non-transitory computer-readable medium communicatively coupled to the processing device, wherein the processing device is configured to execute program code stored in the non-transitory computer-readable medium and thereby perform operations comprising:
accessing a representation of an object in a three-dimensional (3D) space and trajectory information for a trajectory of the object describing a movement of the object from a first location in the 3D space to a second location in the 3D space over a time period, wherein the 3D space is represented by a grid of voxels;
determining a swept volume of the object in the 3D space by evaluating a subset of voxels in the grid of voxels, wherein a number of voxels in the subset of voxels is less than a number of voxels in the grid of voxels, wherein each point in the swept volume is visited by the object at least once during the movement over the time period, wherein the subset of voxels comprises voxels containing a surface of the swept volume and voxels surrounding the surface of the swept volume, and excludes at least one voxel inside the swept volume and at least one voxel outside the swept volume; wherein evaluating the subset of voxels comprises:
determining the swept volume by identifying, from the subset of voxels, a voxel that has a vertex with a minimum signed distance field (SDF) value equal to zero or has a first vertex with a minimum SDF value greater than zero and a second vertex with a minimum SDF value smaller than zero, determining the swept volume further comprising:
identifying a first voxel containing a seed location that is on the surface of the swept volume,
determining an edge of the first voxel between a first vertex of the first voxel having a minimum SDF value greater than zero and a second vertex of the first voxel having a minimum SDF value smaller than zero, and
identifying a neighboring voxel sharing the edge with the voxel for processing; and
generating a representation of the surface of the swept volume based on the subset of voxels.

13. The system of claim 12, wherein the representation of the object comprises a signed distance field (SDF) of the object defined over the grid of voxels, and wherein each vertex of a voxel in the grid of voxels has an SDF value at a given time point indicating a distance from the vertex to the object at the given time point.

14. The system of claim 13, wherein determining the swept volume of the object in the 3D space is performed by determining the surface of the swept volume.

15. The system of claim 14, wherein determining the swept volume of the object in the 3D space comprises:
determining, by using an implicit function determined by the SDF of the object and the trajectory, a minimum SDF value for each vertex of the subset of voxels and a temporal value indicating a time point over the time period when the minimum SDF value is achieved.

16. A non-transitory computer-readable medium storing program code, the program code executable by one or more processing devices for performing operations comprising:
accessing a representation of an object in a three-dimensional (3D) space and trajectory information of the object describing a movement from a first location to a second location in the 3D space over a time period, wherein the 3D space comprises a grid of voxels;
a step for determining a swept volume of the object in the 3D space by evaluating a subset of voxels in the grid of voxels, wherein a number of voxels in the subset of voxels is less than a number of voxels in the grid of voxels, wherein each point in the swept volume is visited by the object at least once during the movement over the time period, wherein the subset of voxels comprises voxels containing a surface of the swept volume and voxels surrounding the surface of the swept volume, and excludes at least one voxel inside the swept volume and at least one voxel outside the swept volume, wherein evaluating the subset of voxels comprises:
determining the swept volume by identifying, from the subset of voxels, a voxel that has a vertex with a minimum signed distance field (SDF) value equal to zero or has a first vertex with a minimum SDF value greater than zero and a second vertex with a minimum SDF value smaller than zero, determining the swept volume further comprising:
identifying a first voxel containing a seed location that is on the surface of the swept volume,
determining an edge of the first voxel between a first vertex of the first voxel having a minimum SDF value greater than zero and a second vertex of the first voxel having a minimum SDF value smaller than zero, and
identifying a neighboring voxel sharing the edge with the voxel for processing; and
generating a representation of the surface of the swept volume based on the subset of voxels.

17. The non-transitory computer-readable medium of claim 16, wherein determining the swept volume comprises determining the surface of the swept volume.

18. The non-transitory computer-readable medium of claim 16, wherein the representation of the object comprises a signed distance field (SDF) of the object defined over the grid of voxels, and wherein each vertex of a voxel in the grid of voxels has an SDF value at a given time point indicating a distance from the vertex to the object at the given time point.

19. The non-transitory computer-readable medium of claim 16, wherein generating the representation of the surface of the swept volume comprises generating a polygon mesh for an outer surface of the swept volume based on the subset of voxels.

20. The non-transitory computer-readable medium of claim 19, wherein the polygon mesh for the outer surface of the swept volume is generated using dual contouring.

* * * * *